(12) United States Patent
Albenze et al.

(10) Patent No.: US 9,597,643 B1
(45) Date of Patent: Mar. 21, 2017

(54) SURFACE FUNCTIONALIZATION OF METAL ORGANIC FRAMEWORKS FOR MIXED MATRIX MEMBRANES

(71) Applicants: Erik Albenze, Bethel Park, PA (US); Michael Lartey, Sunyani (GH); Tao Li, Shanghai (CN); David R. Luebke, Bethel Park, PA (US); Hunaid B. Nulwala, Pittsburg, PA (US); Nathaniel L. Rosi, Pittsburgh, PA (US); Surendar R. Venna, South Park, PA (US)

(72) Inventors: Erik Albenze, Bethel Park, PA (US); Michael Lartey, Sunyani (GH); Tao Li, Shanghai (CN); David R. Luebke, Bethel Park, PA (US); Hunaid B. Nulwala, Pittsburg, PA (US); Nathaniel L. Rosi, Pittsburgh, PA (US); Surendar R. Venna, South Park, PA (US)

(73) Assignee: U.S. Department of Energy, Washington, DC (US)

( * ) Notice: Subject to any disclaimer, the term of this patent is extended or adjusted under 35 U.S.C. 154(b) by 277 days.

(21) Appl. No.: 14/519,743

(22) Filed: Oct. 21, 2014

Related U.S. Application Data (60) Provisional application No. 61/894,014, filed on Oct. 22, 2013.

(51) Int. Cl.
*B01D 53/22* (2006.01)
*B01D 71/68* (2006.01)
(Continued)

(52) U.S. Cl.
CPC ........... *B01D 71/68* (2013.01); *B01D 53/228* (2013.01); *B01D 71/10* (2013.01); *B01D 71/48* (2013.01);
(Continued)

(58) Field of Classification Search
CPC ...... B01D 71/64; B01D 71/54; B01D 53/228; B01D 2053/221; B01D 2257/504;
(Continued)

(56) References Cited

U.S. PATENT DOCUMENTS 7,637,983 B1  12/2009  Liu et al.
7,846,496 B2  12/2010  Liu et al.
(Continued)

OTHER PUBLICATIONS

Makal "Tuning the Moisture and Thermal Stability of Metal—Organic" 2013 American Chemical Society, Cryst. Growth Des. 2013, 13,4760-4768.*

*Primary Examiner* — Anthony Shumate
(74) *Attorney, Agent, or Firm* — Jacob A. Heafner; Michael J. Dobbs; Brian J. Lally (57) ABSTRACT

Mixed Matrix Membrane (MMM) are composite membranes for gas separation and comprising a quantity of inorganic filler particles, in particular metal organic framework (MOF), dispersed throughout a polymer matrix comprising one or more polymers. This disclosure is directed to MOF functionalized through addition of a pendant functional group to the MOF, in order to improve interaction with a surrounding polymer matrix in a MMM. The improved interaction aids in avoiding defects in the MMM due to incompatible interfaces between the polymer matrix and the MOF particle, in turn increasing the mechanical and gas separation properties of the MMM. The disclosure is also directed to a MMM incorporating the surface functionalized MOF.

16 Claims, 5 Drawing Sheets

(51) Int. Cl.
*B01D 71/48* (2006.01)
*B01D 71/56* (2006.01)
*B01D 71/50* (2006.01)
*B01D 71/10* (2006.01)
*B01D 71/54* (2006.01)
*B01D 71/52* (2006.01)
*B01D 71/64* (2006.01)
*B01D 71/60* (2006.01)

(52) U.S. Cl.
CPC ............ *B01D 71/50* (2013.01); *B01D 71/52* (2013.01); *B01D 71/54* (2013.01); *B01D 71/56* (2013.01); *B01D 71/60* (2013.01); *B01D 71/64* (2013.01); *B01D 2053/221* (2013.01); *B01D 2257/504* (2013.01)

(58) Field of Classification Search
CPC ........ B01D 71/48; B01D 71/52; B01D 71/56; B01D 71/60; B01D 71/10; B01D 71/68; B01D 71/50
See application file for complete search history.

(56) References Cited

U.S. PATENT DOCUMENTS

| | | | |
|---|---|---|---|
| 7,998,246 B2 | 8/2011 | Liu et al. | |
| 8,394,453 B2 | 3/2013 | Liu et al. | |
| 8,425,662 B2* | 4/2013 | McGrail | B01D 53/02 95/139 |
| 8,545,606 B2 | 10/2013 | Koros et al. | |
| 9,138,719 B1* | 9/2015 | Eddaoudi | B01J 20/226 |
| 9,139,599 B1* | 9/2015 | Eddaoudi | C07F 1/08 |
| 9,186,651 B2* | 11/2015 | da Silva Pinto | B01D 53/02 |
| 9,440,891 B2* | 9/2016 | Liu | C07C 1/24 |
| 2006/0230926 A1* | 10/2006 | Fritsch | B01D 53/228 95/45 |
| 2007/0209505 A1* | 9/2007 | Liu | B01D 53/228 95/45 |
| 2009/0005243 A1* | 1/2009 | Goddard | B01J 20/22 502/401 |
| 2009/0126566 A1 | 5/2009 | Liu et al. | |
| 2010/0018926 A1 | 1/2010 | Liu et al. | |
| 2010/0226991 A1* | 9/2010 | Horcajada-Cortes | C07F 15/025 424/489 |
| 2010/0282080 A1* | 11/2010 | Omary | B01D 53/02 95/141 |
| 2011/0033776 A1* | 2/2011 | Fuchs | C08G 73/0694 429/492 |
| 2011/0138999 A1 | 6/2011 | Willis | |
| 2011/0165476 A1* | 7/2011 | Pulskamp | H01M 12/06 429/405 |
| 2012/0070353 A1* | 3/2012 | Trukhan | B01D 53/025 423/228 |
| 2013/0047843 A1 | 2/2013 | Matteucci et al. | |
| 2013/0184456 A1* | 7/2013 | Zaworotko | C07F 15/065 540/145 |
| 2013/0274087 A1* | 10/2013 | da Silva Pinto | B01D 53/02 502/4 |
| 2013/0281745 A1* | 10/2013 | Brizius | B01J 31/06 570/190 |
| 2014/0163111 A1* | 6/2014 | Rosi | B01J 20/226 514/619 |
| 2014/0311507 A1* | 10/2014 | Bromberg | A24D 3/0287 131/334 |
| 2014/0323718 A1* | 10/2014 | Donnelly | C07D 487/08 540/465 |
| 2014/0326007 A1* | 11/2014 | Dinca | C07F 3/06 62/112 |
| 2014/0370406 A1* | 12/2014 | Antonelli | H01M 8/065 429/421 |
| 2015/0158012 A1* | 6/2015 | Ramanathan | B01J 20/226 95/96 |
| 2015/0190784 A1* | 7/2015 | Ladewig | B01J 20/226 95/139 |
| 2015/0231600 A1* | 8/2015 | Rosseinsky | B01J 20/226 585/830 |
| 2016/0064773 A1* | 3/2016 | Choi | H01M 10/0565 429/303 |

\* cited by examiner

SURFACE FUNCTIONALIZATION OF METAL ORGANIC FRAMEWORKS FOR MIXED MATRIX MEMBRANES

GOVERNMENT INTERESTS

The United States Government has rights in this invention pursuant to the employer-employee relationship of the Government to the inventors as U.S. Department of Energy employees at the National Energy Technology Laboratory.

FIELD OF THE INVENTION

The invention pertains to functionalized metal organic frameworks for incorporation into mixed matrix membranes for use in separation of gas mixtures. More particularly, the invention pertains to surface functionalization of a metal organic framework through the addition of a pendant functional group, in order to increase the compatibility of the metal organic framework with the surrounding polymer matrix of the mixed matrix membrane.

BACKGROUND

Membranes are a promising area of research for energy-related gas separations such as $CO_2$ removal from flue or fuel gas streams as well as natural gas sweetening. Polymeric membranes are cost effective and widely used for gas separation due to the ease of processing. However, in polymeric membranes there is a tradeoff between improving selectivity and permeability. This tradeoff manifests itself in the Robeson upper bound which establishes upper limit combinations of permeability and selectivity for the best performing membranes. At the upper bound, an increase in permeability is met with a decrease in selectivity. Conversely, inorganic membranes have perm-selectivities that are many times higher than traditional polymeric materials but are not economically feasible for large-scale applications. Most ceramic, glass, and zeolitic membrane materials exhibit costs which are orders of magnitude higher per unit of membrane area when compared to polymeric membranes. Furthermore, inorganic membranes are extremely difficult to fabricate into large, defect-free areas. Low surface area/unit volume, reproducibility, and long term stability of inorganic membranes remains a challenge. A promising route to enhance gas transport properties and fabricate membranes which exceed the Robeson upper bound involves forming composite membranes between polymeric materials and inorganic filler particles to yield mixed matrix membranes (MMM). In theory, the advantages of both the polymer (ease of processing, low cost) and the inorganic material (favorable separation properties) can be realized in a MMM.

MMMs traditionally employ rigid hydrophilic zeolites or carbon molecular sieve particles as the inorganic filler phase. These fillers have surfaces usually not compatible with glassy polymers and this incompatibility of surfaces results in defective polymer/filler interfaces. *Metal-Organic frameworks for Separations*, J. R. Li, et al. Chem. Rev. 112, 869-932. The different non-ideal structures in MMMs have been characterized as interface voids or sieve-in-a-cage, rigidified polymer layer around the inorganic fillers, and particle pore blockage. In order to surpass the Robeson upper bound, the structure of the MMM has to be defect-free at the polymer/filler interface. This ideal morphology is difficult to achieve due to poor polymer/filler adhesion. Overcoming poor adhesion requires careful selection of a filler and polymer which are likely to interact well. However, this limits the selection of polymers and fillers to only those that are likely to form a defect-free interface.

The metal organic framework (MOF) is a relatively new class of porous materials which show promise as adsorbents and membranes for gas separation applications. MOFs are periodic structures that consist of metal ions or clusters interconnected by organic linking ligands. As a result of their organic/inorganic hybrid structure, MOFs may be made more compatible with polymers and show promise as filler materials in MMMs.

MOF structures are highly tailorable: by varying the linking ligand and/or metal ion, one can introduce new functionality, adjust the pore size, and tune the chemical and gas transport properties to a specific application. Additionally, it is possible to control and optimize the interactions between the polymer and the porous MOF filler particles, thereby improving the mechanical and gas separation properties of the MMMs.

Provided herein is a metal organic frameworks functionalized by addition of a pendant functional group. The resulting functionalized metal organic framework has particular applicability to incorporation in a mixed matrix membrane for use in gas separation. Also provided herein is a mixed matrix membrane comprising the functionalized metal organic framework dispersed throughout a polymer matrix.

These and other objects, aspects, and advantages of the present disclosure will become better understood with reference to the accompanying description and claims.

SUMMARY OF THE INVENTION

The present invention describes metal organic frameworks (MOFs) modified by post-synthetic addition of a pendant functional group, for use as fillers in mixed matrix membranes (MMM). The functionalized MOF fillers have highly porous crystalline structures and exhibit characteristics such as large and accessible surface areas and interconnected micropores. MMMs incorporate the surface functionalized MOF fillers into a continuous polymer matrix. The polymer matrix can be selected from all kinds of one or more polymers. Exemplary glassy polymers include but are not limited to polyimides, polyetherimides, polysulfones, and cellulose acetates. Exemplary rubbery polymers include but are not limited to polydimethylsiloxanes and polyethylene oxides. The MMMs bearing uniformly disbursed surface functionalized MOFs combine the properties of both the polymer matrix and the dispersed modified MOF fillers and are useful in gas separation operations.

Through the use of an organic pendant, the present invention controls the interaction at the polymer/MOF filler interface. By controlling the interaction at the interface, on of the major challenges with MMMs, poor interaction between the polymer and filler, is mitigated. The surface functionalization of the MOFs presented here enables modification with a wide variety of functional groups while not altering the internal (i.e. bulk) structure of the MOF. The end result is a robust modified MOF to ensure good adhesion with the surrounding polymer matrix for fabricating MMMs with improved gas separation properties.

These and other objects, aspects, and advantages of the present disclosure will become better understood with reference to the accompanying description and claims.

DETAILED DESCRIPTION

The following description is provided to enable any person skilled in the art to use the invention and sets forth the best mode contemplated by the inventor for carrying out the invention. Various modifications, however will remain readily apparent to those skilled in the art, since the principles of the present invention are defined herein specifically to provide a metal organic framework (MOF) functionalized by post-synthesis addition of a pendant functional group, and a mixed matrix membrane (MMM) incorporating the surface functionalized MOF dispersed throughout a polymer matrix.

The functionalized MOFs of the present invention can have a selectivity that is significantly higher than the pure polymer membranes for separations. These MOFs are crystalline structures comprising repeating metal building units connected by linking ligands via metal-ligands bonds. The MOF materials exhibit analogous behavior to that of conventional microporous and mesoporous materials such as large and accessible surface areas with interconnected intrinsic micropores or mesopores. As such, the MOFs of the invention have very high surface area per unit volume and very high porosities. The pore sized may be controlled with the choice of linking ligand, where larger linking ligands can provide for larger pore size. Additionally, the materials comprising the MOF may be tailored to optimize the separation efficiency for a given gas mixture such as $CO^2$ from flue gas.

To control and optimize the interactions between the surrounding polymer of a MMM and a MOF, structures are analyzed to determine functional groups that are likely to form an ideal interface between the polymer and the MOF. Organic pendant moieties with potential for highly favorable polymer interactions are then chemically linked to the surface of the MOF particle.

The materials of use for the present invention include MOFs with metal building units which may be base metal, metal oxide, metal cluster or metal oxide cluster building units where the metal is selected from the transition metals, the alkali metals, the alkaline earth metals, and the icosagens. Preferentially, the metals of the metal building units are selected from Co, Cu, Cd, Fe, Mg, Mn, Ni, Ru, Zn, and Zr. More preferentially, the metals of the metal building units are Co, Cu, Cd, Fe, Mg, Mn, Ni, Ru, and Zn.

The metal building units are connected by organic compounds known as linking ligands to form a porous crystalline structure. A practitioner will recognize the compounds available for use as linking ligands are numerable. Representative linking ligands for linking the adjacent metal building units include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate ($H_2N$ BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any di-, tri-, or tetra-carboxylate having phenyl compounds.

Figure 1:
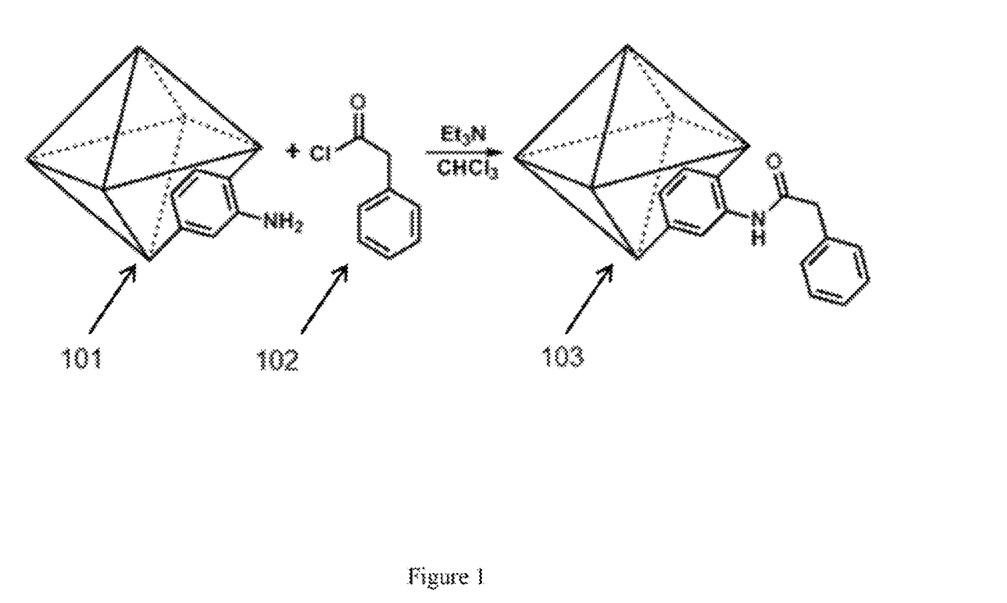
FIG. 1 illustrates an exemplary addition of a pendant functional unit to a MOF.

Functionalization of the MOF of the pendant functional group to form an ideal interface between and surrounding polymer matrix and the MOF is performed after synthesis of the MOF as is represented in FIG. 1. Consequently, functionalization necessarily requires the surface of the MOF to be accessible to the addition of the possible pendant functional groups. MOFs 101 (represent by UiO-66-$NH_2$) via their linking ligands contain functional groups available as reaction sites for the addition of the pendant functional group 102 (represented by a phenyl acetyl group). The addition of the pendant functional group 102 to the MOF 101 results in a functionalized MOF 103 with positive characteristics for an ideal interface between the functionalized MOF 103 and polymer matrix of a MMM. Linking ligand functional sites available include, for example, carboxylates, amines, azides, hydroxyls, halogens, aliphatic amines, methyl, ethyl, and phenyl. Further, the MOFs may include more than one type of open reaction site, for example, both exposed metal sites and amine groups.

Further, linking ligands can be selected from those constructed using carboxylate-based ligands, imidazolate-based ligands, tetrazolate-based ligands, pyrozolate-based ligands, pyridyl-based ligands, triazolate-based ligands, tetrazolate-based ligands. Representative MOF's incorporating these linking ligands include Zr-carboxylate MOFs, Al-carboxylate MOFs, Cr-carboxylate MOFs, zeolitic imidizolate frameworks (ZIFs), Fe-carboxylate MOFs, Ti-Carboxylate MOFs, and MOFs constructed using DOBDC (dioxybenzene dicarboxylate) or DOBPDC (dioxybiphenyldicarboxylate). Ideal MOFs include water-stable Zr-carboxylate MOFs, Ti-carboxylate MOFs, ZIFs, and MOF-74 analogues (those MOFs constructed with DOBDC or DOBPDC linkers).

Surface functionalization of the MOF to form an ideal interface between the polymer matrix and the MOF is performed by addition of a pendant functional group to the MOF, post synthesis of the MOF. The organic pendant may be selected for characteristics favorable for interaction with the polymer such as polarity or bond conjugation. Further, specific functional groups may be chosen such as allyls, amines, ethers, halides, phenyls, hydroxyls, and carboxyls.

The pendant functional groups may be $C_1$-$C_{18}$ saturated or unsaturated straight chain, branched or cyclic alkane, alkene, alkyne, or esters and may incorporate single and multiple functional groups. They may incorporate heterocyclic or homocyclic ring systems that may be aromatic. The pendant functional groups may incorporate hydrocarbyls, halides, and oxygen, nitrogen, and sulfur based functional groups. Representative hydrocarbyl groups include aklenyl, alkynyl, phenyl, and benzyl functional groups. Representative oxygen, nitrogen, and sulfur based functional groups include carbonyls, aldehydes, esters, ethers, hydroxyls, thiols, acetals, carboxyls, amides, amines, imides, imines, azides, cyanates, N-heterocyclic rings, thiols, sulfides, sulfoxides, and sulfones. Preferentially, the pendant functional group incorporates a functional group selected from alkenyl, 4-8 member heterocyclic or homocyclic rings, carbonyl, carboxyl, hydroxyl, amine, amide, imine, imide, thiols, sulfides, and sulfones. Most preferentially, the pendant functional group incorporates a functional group selected from alkenyl, 5-6 member homocyclic or heterocyclic rings, carbonyl, carboxyl, hydroxyl, amine, imide, and thiols.

The mechanism for addition of the organic linker to the surface of the MOF is dependent on the MOF and pendant functional group. For example, the type of reactions used to functionalize the MOF could include acid chloride reactions when the MOF linking ligand presents either an amine or an alcohol, reaction of carboxylate moieties on the surface with an alcohol or amine using carbodiimide based reactions, $S_N2$ reactions to form ether based linkages, and quarternization of amines.

The degree of functionalization by addition of the pendant functional group onto the MOF may be controlled. Selection of pendants of sufficient size to have difficulty entering the pores of the MOF promotes addition of the pendant functional unit only to the linking ligands exposed at the surface of the MOF. Limitation of addition to the surface of the MOF safeguards the interior of the porous MOF to ensure gas permeation through the MOF is largely unaffected by the addition of the pendant functional unit itself. The percentage of linking ligands in a given MOF modified by addition of the pendant functional unit may be determined by methods known in the art such as $^1H$ NMR. Preferentially, less than or about 30% of the linking ligand in a MOF is modified by the addition of the pendant functional group. More preferentially, less than or about 20% of the linking ligand in a MOF is modified by the addition of the pendant functional group. More preferentially, less than or about 10% of the linking ligand in a MOF is modified by the addition of the pendant functional group. Most preferentially, less than or about 5% of the linking ligand in a MOF is modified by the addition of the pendant functional group.

Figure 2:
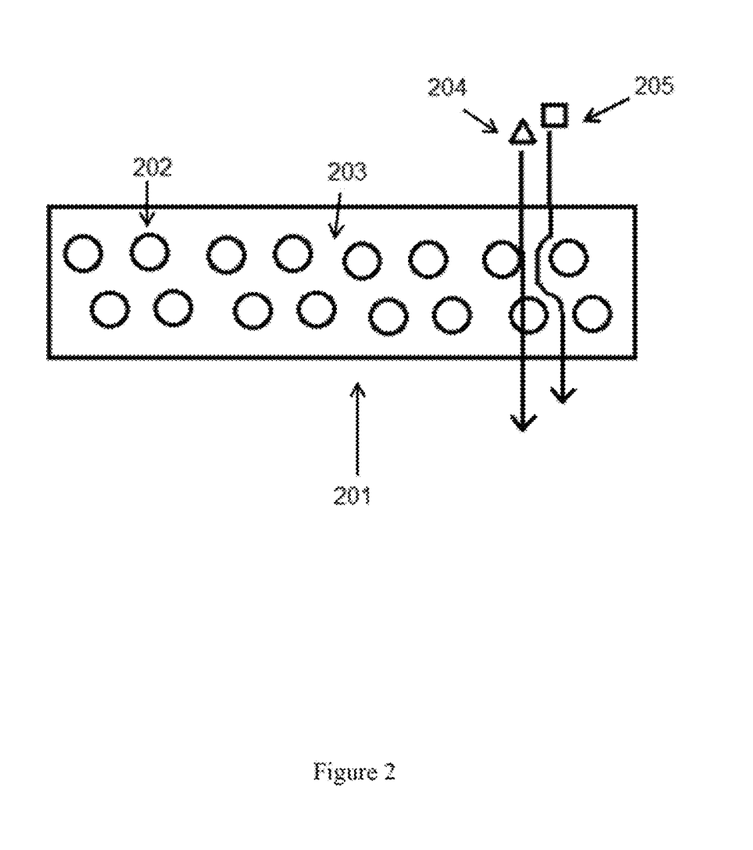
FIG. 2 illustrates a MOF dispersed throughout a MMM.

When the functionalized MOF is incorporated into a MMM, the MOF is dispersed throughout a polymer matrix as is represented in FIG. 2. The MMM 201 is comprised of a MOF 202 dispersed throughout a polymer matrix 203. When used in gas separation, permeate gas 204 is able to quickly traverse the MMM 201 by traveling through the porous MOF 202. A more hindered non permeate gas 205 must travel around the MOF 202, slowly traversing the MMM 201. The difference in rate of travel through the MMM allows for the separation of the individual gas components.

The polymer matrix is comprised of one or more polymers suitable for use in a MMM and may include grafts, blends, and substituted polymers thereof. Suitable polymer materials will pass the selected permeate gas preferentially over the other gasses of the gas mixture. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures (Tg>150° C.). While glassy polymers are preferred, rubbery polymers are contemplated for use in some applications of the invention.

Typical polymers suitable for the polymer matrix can be selected from, but are not limited to, polysulfones; sulfonated polysulfones; polyether sulfones (PESs); sulfonated PESs; polyethers; polyetherimides such as Ultem (or Ultem 1000) sold under the trademark Ultem, manufactured by GE Plastics, poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethylcellulose, methyl cellulose, nitrocellulose; polyamides; polyimides such as Matrimid sold under the trademark Matrimid by Huntsman Advanced Materials (Matrimid 5218 refers to a particular polyimide polymer sold under the trademark Matrimid) and P84 or P84HT sold under the trade name P84 and P84HT respectively from HP Polymers GmbH; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulides; polymers from monomers having alpha-olenic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidine fluoride), poly(vinyl alcohol), poly(vinyl esters) such as poly(vinyl acetate) and poly(vinyl propionate), poly(vinyl pyridines), poly(vinylpyrrolidones), poly(vinyl ethers), poly(vinyl ketones), poly(vinyl aldehydes) such as poly(vinyl formal) and poly(vinylbutyral, poly(vinyl amides), poly(vinyl amines), poly(vinylurethanes), poly(vinyl ureas), poly(vinyl phosphates), and poly(vinyl sulfates); polyallyls; poly(benzobenzimidazole); polyhydrazides; polyoxadiazoles; polyvinyl-triazoles; poly (benimidazole); polycarbodiimides; polyphosphazines; cyclic olefic polymers and its copolymers such as; TOPAS Advanced Polymer's TOPAS, Mitsui Chemical's APEL, Japan Synthetic Rubber's ARTON, Zeon Chemical's Zeonex and Zeoner and its modified polymers; microporous polymers; and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acryl groups and the like.

Some preferred polymers such as the continuous blend polymer matrix include, but are not limited to, polysulfones, sulfonated polysulfones, polyethersulfones (PESs), sulfonated PESs, polyethers, polyetherimides such as Ultem (or Ultem 1000) cellulosic polymers such as cellulose acetate and cellulose triacetate, polyamides; polyimides such as Matrimid, poly(3,3',4,4'-benzophenone tetracarboxylic dianhydride pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromelliticdianhydride-4,4'-oxydiphthalicanhydride-3,3', 5,5'-tetramethyl-4,4'-methylene dianiline) (poly(BTDA-PMDA-ODPA-TMMDA)), poly(3,3',4,4'-diphenylsulfone tetracarboxylicdianhydride-3,3',5,5',-tetramethyl-4,4'-methylene dianiline) (poly(DSDA-TMMDA)), poly(3,3',4,4'-benZophenone tetrocarboxylicdianhydride-3,3',5,5'-tetramethyl-4,4'-methylene dianiline) (poly(DSDA-PMDS-TMMDA)), poly[2,2'-bis-(3,4 dicarboxyphenyl) hexafluoropropane dianhydride-1,3-phenylenediamine] (poly(6FDA-m-PDA)), poly[2,2'-bis-(3,4-dicarboxyphenyl) hexa?uoropropane dianhydride-1,3-phenylenediamine-3,5-diaminobenzoic acid)] (poly(6FDA-m-PDA-DABA)), P84 or P84HT; polyamide/imides; polyketones, polyether ketones; and microporous polymers.

The most preferred polymers of the polymer matrix include, but are not limited to, polyethersulfones, polyimides such as Matrimid, P84, and poly(3,3',4,4' diphenylsulfone tetracarboxylic dianhydride-3,3',5,5'-tetramethyl-4,4'-methylene dianiline), polyetherimides such as Ultem, polysulfones, cellulose acetate, cellulose triacetate, poly(vinyl alcohol)s, and microporous polymers.

The loading of the functionalized MOF fillers in the MMM can be varied by a broad range from less than 1% to 50% by weight. The weight of surface functionalized MOF added to the polymer matrix is expressed as a percent of the total weight of the polymer and MOF. For example, 40 wt % of MOF dope was prepared by mixing 1.33 g of MOF and 2 g of polymer in the chloroform solvent.

Preparation of surface functionalized MOFs and MMMs incorporating them is generally described to enable one skilled in the art to make and use the invention. The selected MOF is synthesized or purchased from a vender. A representative MOF is UiO-66-$NH_2$. Functionalization of the MOF is accomplished by addition of an organic pendant such as phenylacetyl chloride. The surface functionalized MOF is then dispersed throughout an appropriate solvent, and a polymer such as Matrimid 5218 available from Huntsman Chemical is added in portions. A film is then cast The MMM may then be utilized for gas separation operations such as removal of CO2 from a flue gas stream.

EXAMPLES

MMMs were developed using neat and surface functionalized UiO-66-$NH_2$ as the dispersed phase and Matrimid as the polymer matrix. Matrimid was selected as the polymer for this study because it is a well-characterized glassy polymer and incorporation of fillers into such glassy polymers like Matrimid has proven difficult. Four MOFs having polar, non-polar, or aromatic surface functional groups were compared to demonstrate the effectiveness of the invention: neat UiO-66-$NH_2$ (I), aromatic-modified I ($I_{PA}$), aliphatic $C_{10}$-modified I ($I_{C10}$), and acid-modified I ($I_{SA}$). UiO-66-$NH_2$ was chosen as the base MOF filler because the Lewis-basic amino groups promote selective adsorption of $CO_2$ and can serve as open reaction sites for addition of a pendant.

Post-Synthetic Modification of UiO-66-$NH_2$ (1) for functionalization of the $NH_2$-BDC linking ligand.

by addition of the loaded solution on glass plate with a casting knife in a glove bag. The solvent is then evaporated away slowly and the resulting MMM is dried and annealed.

Within the demonstration, it was expected interaction between the MOF and polymer would be most highly optimized with the aromatic-modified I ($I_{PA}$) serving as the pendant functional unit. The steric and bonding characteristic of the moiety would most favorably interact with the Matrimid through hydrogen bonding and π-π stacking.

Favorable interactions between the Matrimid polymer and $I_{PA}$ based on surface functionality.

For preparation of the neat Matrimid dense membrane, Matrimid was dried in a vacuum oven at 120° C. overnight. Next, a dope solution was formed by dissolving the Matrimid in chloroform followed by mixing on a roller mixer. Then, the dope was kept stationary overnight to remove any retained gas bubbles. Prior to casting, a glove bag was purged with $N_2$ to remove any humidity and was saturated with chloroform to slow the rate of solvent evaporation from the membrane. Matrimid dense membranes were cast onto a glass plate in the glove bag using a casting knife. The resulting membrane was kept for 2 days in the glove bag as the chloroform evaporated slowly from the membrane. The membrane was dried at 100° C. overnight followed by annealing at 225° C. in a vacuum oven for 2 hours. Finally, the membrane was slowly cooled to room temperature.

EXAMPLE 1

Synthesis of UiO-66-NH$_2$ (I)

Stock solutions of $ZrCl_4$ (0.1 M), 2-aminoterephthalic acid (0.1 M), and HCl (conc.) (1 M) in DMF were first prepared. To a 40 ml vial were added 10 mL $ZrCl_4$ (1 mmol), 20 mL 2-aminoterephthalic acid (2 mmol), and 3 mL HCl (3 mmol). The vial was capped and heated in a 120° C. oven for 24 hours. Yellow microcrystalline product was centrifuged (5 min, ~1000 rpm) and washed first with DMF (3X) and then with $CHCl_3$ (3X). The product was then dried in a 130° C. oven (24 h), collected, and stored in a capped vial and used for subsequent functionalization steps without further purification.

EXAMPLE 2

Modification of I with Phenyl Acetyl Group ($I_{PA}$)

I (2.0 g, 0.63 mmol) was suspended in $CHCl_3$ (20 mL) in a 40 mL vial. While stirring, phenylacetyl chloride (1.5 mL, 11.4 mmol) and triethylamine (1.4 mL, 10 mmol) were added and the resulting mixture was allowed to stir at room temperature (16 h). The yellow product was centrifuged (5 min, ~1000 rpm), washed with chloroform (3X), and dried in a 130° C. oven (16 h). The product was stored in a capped vial.

EXAMPLE 3

Modification of I with Decanoyl Acetyl Group ($I_{C10}$)

I (2.0 g, 0.63 mmol) was suspended in $CHCl_3$ (20 mL) in a 40 mL vial. While stirring, decanoyl chloride (2.4 mL, 11.4 mmol) and triethylamine (1.4 mL, 10 mmol) were added and the resulting mixture was allowed to stir at room temperature (16 h). The yellow product was centrifuged (5 min, ~1000 rpm), washed with $CHCl^3$ (3X), and dried in a 130° C. oven (16 h). The product was stored in a capped vial.

EXAMPLE 4

Modification of I with Succinic Acid Group ($I_{SA}$)

I (2.0 g, 0.64 mmol) was placed in dry DMF (20 mL with 3Åmolecular sieves (~5-10 sieves dried for 2 d at 200° C. and then evacuated prior to use). While stirring, succinic anhydride (2.0 g, 19.9 mmol) was added and the mixture was heated in a 60° C. oil bath (16 h). The yellow product was centrifuged (5 min, ~1000 rpm), washed with DMF (3X), washed with $CHCl_3$ (3X), and then dried in a 130° C. oven (16 h). The product was stored in a capped vial.

For preparation of the MMMs, both the Matrimid and MOF were dried in a vacuum oven at 120° C. overnight. Preparation of a dope solution followed the standard 'priming' technique in which the MOF particles were first dispersed in chloroform solvent using an ultrasonication water bath for 2 hours to obtain a homogenous dispersion. Next, the MOF crystals were primed by adding 30% of the total Matrimid to the MOF/chloroform solution followed by roller mixing and sonication for another 2 hours. The remaining Matrimid polymer was added in two steps (30% and 40%) followed by stirring and sonication after each addition. The mixed matrix membranes were formed by casting the mixed matrix dope as discussed above for the neat Matrimid membranes.

The MOF loading was controlled by changing the mass ratio of MOF to Matrimid in the mixed matrix dope solution. MMMs with low (12 wt %), medium (23 wt %), and high (40 wt %) loadings of MOF were fabricated using I (MMM-I) and $I_{PA}$ (MMM-$I_{PA}$). MMMs were also prepared using 23 wt % $I_{SA}$ (MMM-$I_{SA}$) and 23 wt % $I_{C10}$ (MMM-$I_{C10}$) to study the effect of different surface functionalizations on the Matrimid/MOF filler adhesion and the gas separation performance. The loadings represented here—12 wt %, 23 wt %, and 40 wt %—correspond to volume percentages of approximately 11%, 22% and 38%, respectively.

Figure 3:
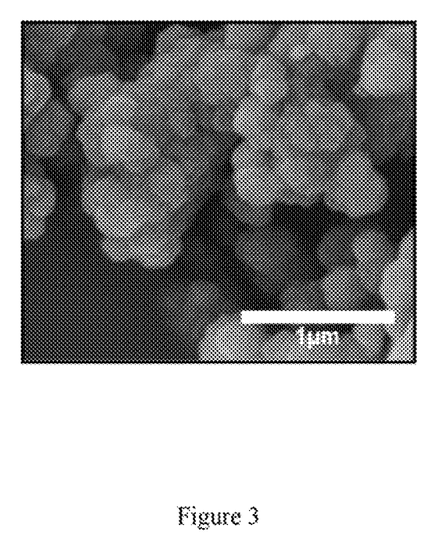
FIG. 3 illustrates a generated SEM image of a MOF functionalized by the addition of a pendant functional group.

The base and functionalized MOFs and the MMMs incorporating them where thoroughly characterized. Powder X-Ray diffraction (PXRD) patterns of I before and after functionalization are in good agreement with the simulated XRD pattern, confirming formation of the pure phase crystalline I and as $I_{PA}$, $I_{SA}$, and $I_{C10}$ were also consistent with the pattern of I, confirming that the crystallinity was maintained even after functionalization. SEM images of each of the MOF analogues were used to determine the average particle size. The average particle size of all these MOF analogues was ~200 nm. An image of $I_{P4}$ particles is shown in FIG. 3 as an example; no changes in the particle morphology were observed after the modification.

The composition of $I_{P4}$, $I_{SA}$, and $I_{C10}$ was determined by collecting XPS spectra of as-prepared and crushed samples and $^1$H NMR spectra for digested MOF samples, $^1$H NMR was used to determine the ratio between unfunctionalized and functionalized ligand for $I_{P4}$, $I_{SA}$, and $I_{C10}$. The percentage of functionalized ligands was found to be 5% for $I_{P4}$, 2% for $I_{C10}$, and 32% for $I_{SA}$. It is expected that, for $I_{P4}$ and $I_{C10}$, the phenyl substituents and $C_{10}$ chains are located on the external surface of the MOF particles, because functionalization at internal amino sites would be significantly limited by diffusion of the large phenyl and $C_{10}$ reactants. XPS analysis of the functionalized MOFs before and after crushing also indicated that the pendant was likely predominantly on the external surface of the MOF particles. The observed BET surface areas for $I_{P4}$ and $I_{C10}$ are similar to that for I, which is consistent with this interpretation. It is noted from the results that the SA groups react significantly with internal amino sites, because 32% of the ligands are functionalized with SA. SA is smaller than phenylacyl chloride and decanoyl chloride, and its reaction with the internal amino groups would not be nearly as diffusion limited. The BET surface area for $I_{SA}$ is significantly lower than I, which, again, is consistent with the observed degree of functionalization.

Pure gas $CO_2$ and $N_2$ permeation measurements of neat Matrimid and the MMMs were completed using an isochoric permeation system at room temperature and 20 psia pressure. The results are presented in FIGS. 4 and 5.

Figure 4:
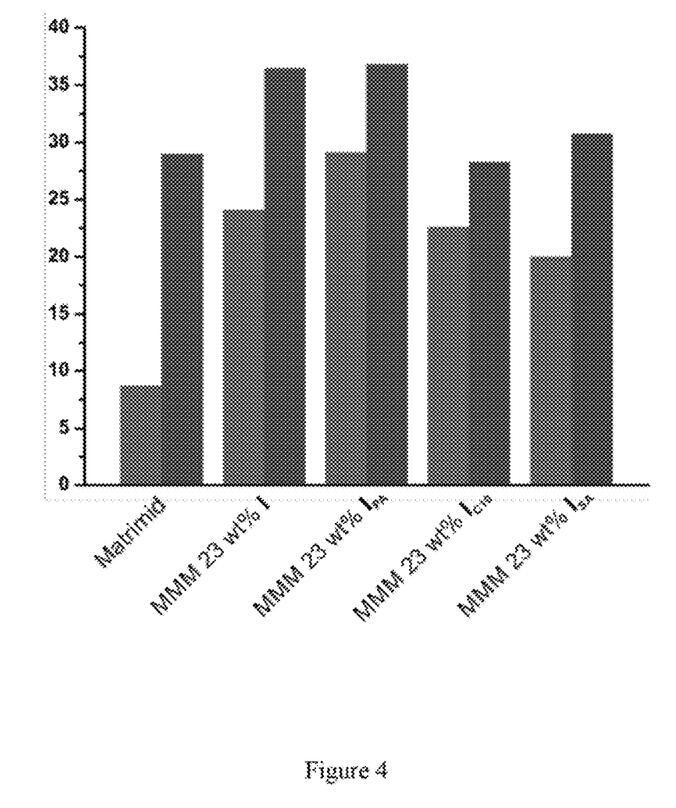
FIG. 4 illustrates $CO_2$ permeability (left columns, in Barrer) and $CO_2$:$N_2$ selectivity (right columns) for 12, 23, and 40 wt %, loadings of MOFs incorporating the functional pendant group.
Figure 5:
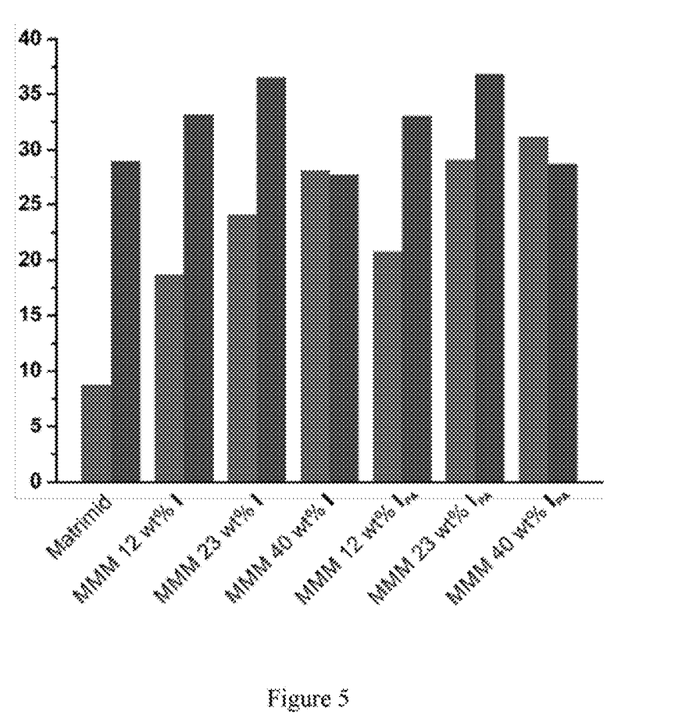
FIG. 5 illustrates $CO_2$ permeability (left columns, in Barrer) and $CO_2$:$N_2$ selectivity (right columns) for Matrimid as well as MMMs containing 23 wt % of the functionalized MOFs.

FIGS. 4 and 5 presents the permeability and selectivity results for the MMMs with 23 wt %, loading of all four MOF analogues. In all cases, the $CO_2$ permeability increased compared to the value for the neat Matrimid polymer. In addition to an increase in the permeability, the MMMs with I and $I_{P4}$ filler particles also an increase in selectivity compared to the neat Matrimid film. The improvement in selectivity is attributed to the formation of a detect-free interface between the particle and polymer.

The transport properties for the MMMs with the $I_{SA}$ and $I_{C10}$ functionalized MOFs are also shown in FIG. 4. The $I_{SA}$ MMMs showed only slight improvement in selectivity over pure Matrimid, while $I_{C10}$ showed a decrease in selectivity. These membranes were also the most brittle. The decreased performance was predicted by examining the structure of Matrimid which contains aromatic and imide groups. The pendants (SA—polar; $C_{10}$—non-polar alkyl) were not expected to interact well with the functional groups in the Matrimid polymer. Conversely, for —$NH_2$ and —PA surface-functionalized MOFs, the aromatic groups present in the polymer were expected to interact favorably through $\pi$-$\pi$ stacking with the aromatic ring of the —PA group and the imide groups in the polymer were expected to interact favorably with the —$NH_2$ groups and amide linkages through hydrogen bonding. Furthermore, since all four MOF analogues have nearly identical internal structure and functionality and only differ by the pendant at the surface, it is shown that simply changing the pendant can significantly affect whether the polymer/filler interface is truly detect free.

The invention disclosed is particularly useful for the fabrication of mixed matrix membranes for use in separation of gas mixtures. In certain embodiments, a metal organic framework is surface functionalized with an organic pendant. Subsequently, the surface functionalized metal organic framework is incorporated into a mixed matrix membrane.

All publications and patent documents cited in this application are incorporated by reference in their entirety for all purposes to the same extent as if each individual publication or patent document were so individually denoted.

We claim:

1. A metal organic framework comprising:
   a plurality of metal building units;
   a plurality of linking ligands where linking ligand is chemically bound to at least two metal building units; and,
   a plurality of pendant functional groups where pendant functional group is chemically bound to less than or about 20% of the plurality of linking ligands.

2. The metal organic framework of claim 1 where pendant functional group is bound to less than or about 10% of the plurality of linking ligands.

3. The metal organic framework of claim 1 where pendant functional group is bound to less than or about 5% of the plurality of linking ligands.

4. The metal organic framework of claim 1 where addition of the pendant functional group is to a functional group of the linking ligand, where the functional group is selected from the group comprising carboxylate, amine, azide, hydroxyl, aliphatic amine, methyl, and halide.

5. The metal organic framework of claim 4 where addition of the pendant functional group is to a functional group of the linking ligand, where the functional group is selected from the group comprising carboxylate, amine, hydroxyl, and halides.

6. The metal organic framework of claim 1 where the pendant functional group is a $C_1$-$C_{18}$ saturated or unsaturated straight chain, branched or cyclic alkane, alkene, alkyne, or ester.

7. The metal organic framework of claim 6 where the pendant functional group incorporates a functional group selected from the group comprising alkenyl, 4-8 member heterocyclic or homocyclic rings, carbonyl, carboxyl, hydroxyl, amine, amide, imine, imide, thiols, sulfides, and sulfones.

8. The metal organic framework of claim 6 where the pendant functional group incorporates a functional group selected from the group comprising alkenyl, 5-6 member homocyclic or heterocyclic rings, carbonyl, carboxyl, hydroxyl, amine, imide, and thiols.

9. The metal organic framework of claim 1 where the metal building unit is selected from the group comprising Co, Cu, Cd, Fe, Mg, Mn, Ni, Ru, Zn, and Zr.

10. The metal organic framework of claim 9 further comprising
   a. where the metal building unit is selected from the group comprising Co, Cu, Cd, Fe, Mg, Mn, Ni, Ru, and Zn;
   b. where addition of the pendant functional group is to a functional group of the linking ligand, where the functional group is selected from the group comprising carboxylate, amine, azide, hydroxyl, aliphatic amine, methyl, and halides; and,
   c. where the pendant functional group is a $C_1$-$C_{18}$ saturated or unsaturated straight chain, branched or cyclic alkane, alkene, alkyne, or ester.

11. The metal organic framework of claim 9 further comprising
   a. where the metal building unit is selected from the group comprising Co, Cu, Cd, Fe, Mg, Mn, Ni Ru, and Zn;
   b. where addition of the pendant functional group is to a functional group of the linking ligand, where the functional group is selected from the group of carboxylate, amine, azide, hydroxyl, aliphatic amine, methyl, and halides;
c. where the pendant functional group is $C_1$-$C_{18}$ saturated or unsaturated straight chain, branched or cyclic alkane, alkene, alkyne, or ester; and,
d. where addition of pendant functional group is bonded to less than or about 10% of the plurality of linking ligands.

12. The metal organic framework of claim 9 further comprising
a. where the metal building unit is selected from the group comprising Co, Cu, Cd, Fe, Mg, Mn, Ni, Ru, and Zn;
b. where addition of the pendant functional group is to a functional group of the linking ligand, where the functional group is selected from the group of carboxylate, amine, hydroxyl, and halides; and,
c. where the pendant functional group is a $C_1$-$C_{18}$ saturated or unsaturated straight chain, branched or cyclic alkane, alkene, alkyne, or ester.

13. The metal organic framework of claim 9 further comprising
a. where the metal building unit is selected from the group comprising Co, Cu, Cd, Fe, Mg, Mn, Ni, Ru, and Zn;
b. where addition of the pendant functional group is to a functional group of the linking ligand, where functional group is selected from the group of carboxylate, amine, hydroxyl, and halides;
c. where the pendant functional group is $C_1$-$C_{18}$ saturated unsaturated straight chain, branched or cyclic alkane, alkene, alkyne, or ester; and,
d. where addition of pendant functional group is bonded to less than or about 10% of the plurality of linking ligands.

14. The metal organic framework of claim 9 further comprising
a. where the metal building unit is selected from the group comprising Co, Cu, Cd, Fe, Mg, Mn, Ni, Ru, and Zn;
b. where addition of the pendant functional group is to a functional group of he linking ligand, where the functional group is selected from the group of carboxylate, amine, azide, hydroxyl, aliphatic amine, methyl, and halides; and,
c. where the pendant functional group incorporates a functional group selected from alkenyl, 4-8 member heterocyclic or homocyclic rings, carbonyl, carboxyl, hydroxyl, amine, amide, imine, imide, thiols, sulfides, and sulfones.

15. The metal organic framework of claim 9 further comprising
a. where the metal building unit is selected from the group comprising Co, Cu, Cd, Fe, Mg, Mn, Ni, Ru, and Zn;
b. where addition of the pendant functional group is to a functional group of the linking ligand, where the functional group is selected from the group of carboxylate, amine, azide, hydroxyl, aliphatic amine, methyl, and halides; and,
c. where the pendant functional group incorporates a functional group selected from alkenyl, 5-6 member homocyclic or heterocyclic rings, carbonyl, carboxyl, hydroxyl, amine, imide, and thiols.

16. The metal organic framework of claim 9 further comprising
a. where the metal building unit is selected from the group comprising Co, Cu, Cd, Fe, Mg, Mn, Ni, Ru, and Zn;
b. where addition of the pendant functional group is to a functional group of the linking ligand, where the functional group is selected from the group of carboxylate, amine, azide, hydroxyl, aliphatic amine, methyl, and halides; and,
c. where the pendant functional group is a incorporates a functional group selected from alkenyl, 5-6 member homocyclic or heterocyclic rings, carbonyl, carboxyl, hydroxyl, amine, imide, and thiols; and,
d. where addition of the pendant functional group is bonded to less than or about 10% of the plurality of linking ligands.

* * * * *